Fig. 1

March 27, 1962 K. RANTSCH 3,026,620
OPTICAL MEASURING MACHINES FOR MEASURING
THE LENGTH OF WORKPIECES
Filed Jan. 10, 1958 10 Sheets-Sheet 2

INVENTOR
Kurt Rantsch
BY

INVENTOR.
Kurt Rantsch
BY
Singer Stern & Carlberg
attys

March 27, 1962  K. RANTSCH  3,026,620
OPTICAL MEASURING MACHINES FOR MEASURING
THE LENGTH OF WORKPIECES
Filed Jan. 10, 1958  10 Sheets-Sheet 7

INVENTOR.
Kurt Rantsch

March 27, 1962  K. RANTSCH  3,026,620
OPTICAL MEASURING MACHINES FOR MEASURING
THE LENGTH OF WORKPIECES
Filed Jan. 10, 1958

Fig. 18

INVENTOR.
Kurt Rantsch
BY
Singer Stern & Carlberg

March 27, 1962 K. RANTSCH 3,026,620
OPTICAL MEASURING MACHINES FOR MEASURING
THE LENGTH OF WORKPIECES
Filed Jan. 10, 1958 10 Sheets-Sheet 10

INVENTOR
Kurt Rantsch
BY

United States Patent Office 3,026,620
Patented Mar. 27, 1962

3,026,620
OPTICAL MEASURING MACHINES FOR MEASURING THE LENGTH OF WORKPIECES
Kurt Räntsch, Wetzlar, Lahn, Germany, assignor to M. Hensoldt & Sohne Optische Werke, A.G., Wetzlar, Germany
Filed Jan. 10, 1958, Ser. No. 708,232
Claims priority, application Germany Jan. 12, 1957
17 Claims. (Cl. 33—147)

The invention relates to optical measuring machines, and particularly is directed to a length measuring machine in which the measuring scale is arranged parallel to the measuring axis and in which for reading of the measuring value a reading device is employed which is slidable relative to the measuring scale. The reading device is usually mounted in the measuring carriage while the workpiece whose length is to be measured is mounted between the points of the stationarily mounted head carriage and the measuring carriage. In measuring machines of this type it is necessary to make provision that any errors or inaccuracies caused by the slidable connection between the carriage supporting guide and the slidably adjustable measuring carriage, such as slight tiltings of the carriage within or on the guide of the carriage are compensated or made ineffective in other manner, because, unless these errors in the guide of the measuring carriage are eliminated, they would result in an incorrect reading or indication of the measurement.

Such a compensation of unavoidable inaccuracies in the mechanical construction of the guide used for measuring carriages is possible by exploiting the properties of the principal points in optical projection systems, for instance, when the length measuring machine is constructed in accordance with the article published on page 348 of the "Taschenbuch der Längenmesstechnik," 1954, of Leineweber. According to the mentioned length measuring machine described in said book the head carriage and also the measuring carriage are each provided with an optical system which projects the measuring graduation into a reading microscope and between which a parallel pathway of the light rays is in existence. The focal lengths $f$ of the two similar systems are selected to be equal to the distance between the measuring scale and the measuring axis (headstock center axis), so that the forward negative center point lies in the measuring axis, and an inclined position of the system caused by an inaccurate guide will have only a very small influence upon a correct reading of the measuring scale which is arranged in the forward focal point. This projection, therefore, avoids errors of the first order which may occur owing to inaccuracies in the guide ways which inaccuracies may be due to inaccuracies in the manufacture or to wear. However, this arrangement requires a difficult and substantial construction, and then it is only possible to project very small fields of view. Furthermore, very finely graduated scales are necessary at least on the side of the reading microscope.

It is an object of the present invention to overcome these disadvantages in that any inaccuracies in the guides are not compensated solely by purely optical means, but by a combination of optical means and mechanical means. For this purpose, the present invention provides in the path of the rays of the reading device at least one oscillatable optical element for the compensation of small inclinations of the measuring carraige and of the reading device.

Such oscillatable elements or pendulums have heretofore been employed in telescopic level instruments for the purpose of compensating for small inclinations of the instrument. In accordance with the present invention it is, however, new to employ such pendulums in length measuring machines for the purpose mentioned.

In accordance with one embodiment of the invention, there is employed for the projection of the graduation of the measuring scale an objective glass which is arranged at a distance equal to its focal length away from the measuring scale, and has a focal length which is equal to one-half of the distance between the measuring scale and the measuring axis, whereby the oscillatable elements, for instance, a plane mirror, are arranged in the parallel path of the rays in the rear of the objective glass.

When in such a construction the entire reading device is tilted, for instance, about an axis which intersects the measuring axis then there will appear in the viewing field of the reading device the same measuring point, because the inclination of the instrument has been compensated for by the relative change of the position of the plane mirror in the reading device.

In place of the oscillatable element or pendulum, one may also employ an angular mirror which reflects the light rays transversely with respect to the measuring axis, whereby the pendulum axis of this angular mirror is arranged at right angles to the measuring axis. The effect of such an angular mirror is then exactly the same as that of the above described effect of the plane mirror, the difference being only that a lateral displacement of the projecting rays takes place, and this is very often desirable.

It is also possible, and sometimes of advantage, to employ as oscillatable elements or pendulums at least one pair of lenses of which one lens is mounted stationarily and the other lens is mounted on a pendulum so as to be able to oscillate. When one of the lenses, namely, the movable one, moves sideways there is formed by the two lenses an optical wedge. Such a construction has the advantage that the requirements concerning the adjustment of the suspension point are not as great as when a plane mirror is used, because a displacement of the suspension point in the direction of the axis of the lens is not of any importance.

If one selects such a pair of lenses for the compensation of the inclination of the instrument, then it is advisable to select lenses which have opposite, but the same focal length. If the oscillating lens consists of glass having a refraction index of 1.5 then the oscillating point is arranged at a distance away from the principal point which is equal to the focal length of the lens.

Also in this case, the lenses are preferably arranged in the parallel paths of light rays in the rear of a lens which itself is placed at a distance from the measuring scale which is equal to the focal length of said lens. Since one is able by a suitable selection of the focal lengths of the lenses, and the location of the suspension point of the oscillating lenses, to obtain any desired optical transmission for the deflection of the rays the focal length of the mentioned objective glass need not be subjected to special conditions.

It is of advantage to make the oscillating lens biconvex and arrange it between two stationary plano-concave lenses in such a manner that only a small space remains between these lenses, and to fill the space between the lenses with a fluid having a low refractive index so that there will be obtained corresponding ray deflecting conditions having the advantage that the oscillating movement is damped.

In order to make the conditions still more independent of adjustment, one may use for the deflection of the rays two focal systems of which the second produces an enlargement $N_2$ and is mounted in the form of a pendulum, while the first system produces an enlargement $N_1$ and is fixedly mounted so that for the two mentioned systems the following condition prevails:

$$N_1 + 1/N_2 = 1$$

These two systems are no longer position sensitive but only sensitive to tilting.

All of the above described systems have the property of reflecting the target rays so as to compensate any inclination of the reading device. Obviously, there may also be employed pendulum systems which produce only a parallel displacement of the target ray. For the last mentioned purpose may be used a right-angled prism suspended in the form of a double pendulum.

In all of the above embodiments it is advisable to secure at least the optical element which is positioned directly above the measuring scale and whose graduations are to be projected by said optical element, rigidly to the pointed pin whose center axis forms the measuring axis and is arranged in the adjustable measuring carriage. If this is done, then the reading device may at the same time be employed for adjusting the pressure exerted upon the workpiece arranged between the points on the anvil carriage and the measuring carriage, because any slidable displacement of the measuring carriage, owing to pressure variations, will be indicated by the reading device.

Obviously, the arrangement according to the present invention is not limited to length measuring machines, but may also be used for all other machines and devices in which carriage displacements are necessary and in which inaccuracies in the guides of these carriages may affect the accuracy of the adjustment or may affect the accuracy of the measuring indications.

It will be noted from the foregoing, that in order to compensate for any inaccuracies between the measuring scale plane and the measuring plane which may occur when, for instance, the measuring carriage or the reading device is tilted, the invention combines the reading device with at least one oscillatable optical element. Such a type of length measuring machine may be further modified with advantage and may be used as a coordinate measuring table in that, for instance, the reading device is operatively connected with a workpiece mounted on a table surface. This table, together with the reading device, will then be slidably displaced in the guide relative to the fixedly mounted measuring scale. In such an arrangement, however, it is necessary that the compensating principle between the measuring plane or guide plane and the working plane of the workpiece be maintained when the working on the workpiece is to take place according to predetermined measurements. This is possible with the means employed for constructing the above described length measuring machine, provided the working plane contains the measuring axis of the indicated length measuring machine. In machine tools, however, this is not always the case because the individual workpieces have a different height so that compared with the length measuring machine the measuring plane will always be at a different distance from the plane of the measuring scale.

If it is desired to work on workpieces having a different height, then the compensating principle employed in the above mentioned length measuring machine is not very accurately fulfilled. Therefore, the present invention provides another embodiment in which the compensating principle may also be fulfilled and used to advantage even though the working planes are arranged in different elevations.

In the above described length measuring machine it is required that, for the employment of the compensating principle between the plane of the measuring scale and the measuring plane, certain conditions concerning the focal length of the projecting objective of the reading device have to be fulfilled, namely, the focal length has to be equal to one-half the distance between the plane of the measuring scale and the measuring plane and also the mentioned embodiments of the length measuring machines require that the length of the arms of the pendulums for the optical elements have to be of a certain size, for instance, when a suspended right-angled prism is used the length of the pendulum arms has to be equal to one-half of the distance between the plane of the measuring scale and the measuring plane.

If the first described embodiment of the length measuring machine is used for measuring workpieces of different height this could be accomplished by providing the objective lens with an adjustable focal length, but this is rather difficult to accomplish in actual practice. It has to be considered that whenever the focal length is changed the enlarging scale of the reading device is changed at the same time, and each change in the enlargement would require another subdivision of the graduation of the measuring scale by employing a special calculating table with the reading device and this, of course, is not very practical.

It is, however, substantially simpler when according to another object of the present invention, the length of the pendulum arms of the oscillatable elements is made variable.

If one employs, for instance, as an optical pendulum, at least one right-angled prism and suspends the same by means of two chains or pairs of chains, and if one provides means to arrest the pendulum arms at any desired link of each chain, then it is possible to change the length of the pendulum arms according to the level in which the working plane of the workpiece is arranged. For this purpose, it is only required to arrest and secure one or the other link of the individual chains which hold the optical element suspended.

It is obvious from the foregoing that in the case of chains, the variation of the length of the same takes place, step by step, or link by link, and ordinarily the individual steps can be selected so that all available positions of the working plane can be taken care of with sufficient accuracy.

The maximum or total length of the pendulum corresponds to the highest position of the working plane. Each displacement of the working plane towards the measuring scale can then be compensated by a suitable shortening of the pendulum length.

It should be obvious that one may also make the construction of such a type that the length of the pendulums can be changed continuously, for instance, when the prism is suspended by two pairs of threads, cables, wires or the like, and when these threads, cables, wires or the like are threaded through two narrow holes in a horizontally disposed plate which may be adjusted to different elevations gradually by a suitable mechanism. For obtaining a safe anchor point for the effective suspension points the holes in the plate are suitably laterally displaced with respect to the highest or upper ends of the cables which are permanently secured in the measuring carriage.

If, in accordance with the present invention, the working plane of the workpiece is arranged at a very high elevation then it may happen that the total length of the pendulum will become rather long and this is frequently not desired.

It is, therefore, another object of the present invention to provide a measuring machine in which a number of right-angled prisms is suspended as a group by the described suspension elements in such a manner that the light rays are reflected by these prisms and by an additional stationary prism positioned therebetween. In case two pendulum prisms are provided with a stationary prism therebetween the required length of the pendulum will be shortened by one-half.

These and other objects of the invention will be best understood and appreciated from the following description of a few embodiments of the invention which have been described for the purpose of illustration shown in the accompanying drawings in which:

FIG. 13 illustrates the same light ray reflecting means as shown in FIG. 12, but indicates in what manner a distortion is compensated for;

Figure 1:
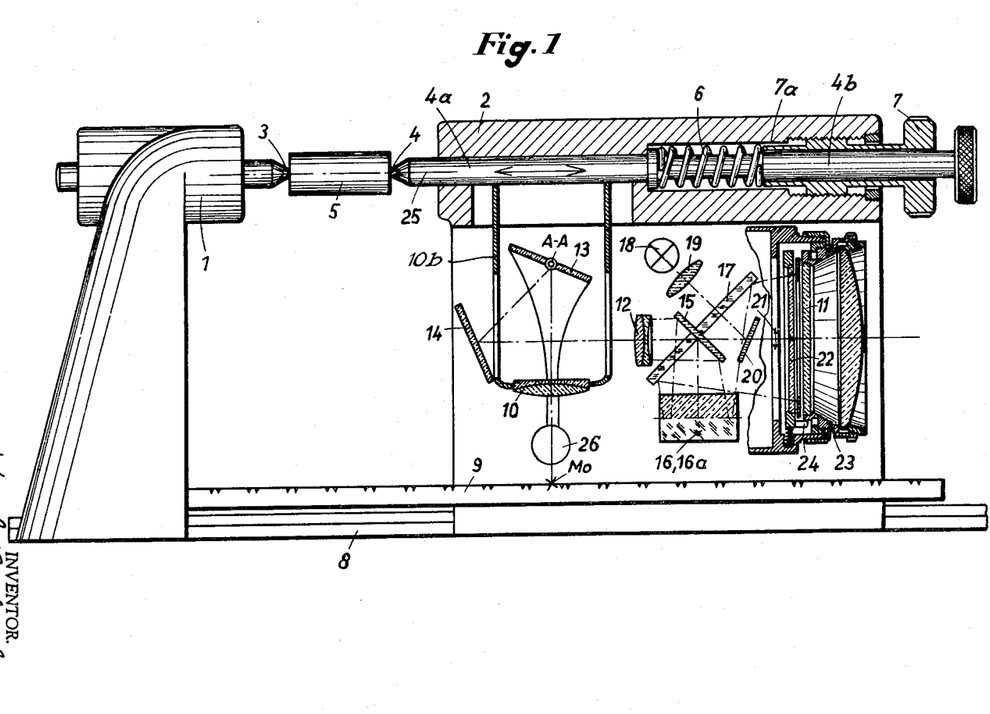
FIG. 1 is a side elevation view of a machine for measuring the length of an object in accordance with the invention, certain parts of the machine being illustrated in a sectional view.

Referring to FIG. 1, the head carriage 1 and the measuring carriage 2 are mounted slidably on a horizontal guide 8. The head carriage 1 is usually fixed in position on the guide 8 while the measuring carriage 2 is adjustable lengthwise on the guide 8 and may be moved towards and away from the head carriage 1. The head carriage is provided with a point 3 and the measuring carriage also is provided with a point 4 on a horizontally arranged pin 4a. The workpiece 5, the length of which is to be measured, is mounted between the points 3 and 4. The point 4 is urged by a helical pressure spring toward the left and the pressure of the spring 6 is adjustable by a sleeve-like adjustment member which surrounds a reduced portion 4b of the pin 4a and is in threaded engagement with an interior thread provided in an axial bore 7a within the upper portion of the carriage 2.

Figure 2:
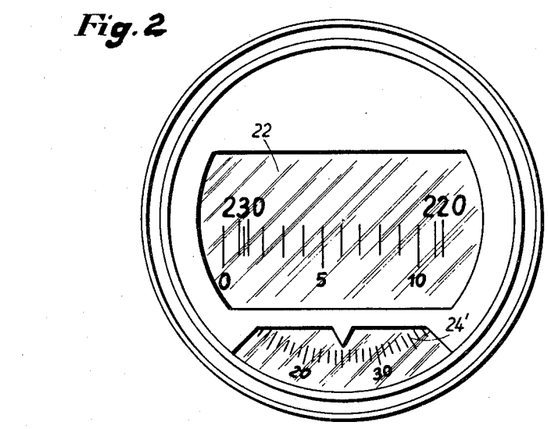
FIG. 2 is a view of the reading window of the reading device which is incorporated in the measuring machine illustrated in FIG. 1.

A linear measuring ruler or scale 9 is arranged parallel to the guide 8 in the immediate neighborhood thereof. The measuring carriage 2 has mounted therein a reading device which includes an objective glass 10 positioned directly above the graduation of the measuring scale 9 in order to project the graduation into a reading window 11 by means of a suitable intermediate lens 12 and reflectors 13, 14, 15, 16, 16a and 17. The objective glass 10 is mounted in the lower portion of a frame 10b the upper portion of which is fixedly attached to the pin 4a. The reflector 15 is partially transparent and serves for the purpose of illuminating the measuring scale 9. For this purpose there is provided a lamp 18 which projects the light rays through a condenser lens 19 and onto a mirror 20 and then into the optical axis of the lens 12. Adjacent the reading window 11 there is arranged a slidably adjustable finely graduated measuring scale 22 adapted to be linearly adjusted in the direction of the arrow 21. The displacement of this finely graduated measuring scale 22 is effected by means of an eccentric ring 23 which engages a pin 24 carried by the finely graduated measuring scale 22. The amount of rotation of the eccentric ring 23, and therewith the adjustment of the finely graduated scale 22, is read off on a scale 24' (FIG. 2). The reading device, per se, is not an object of the present invention, but may be constructed similar to the reading device described in applicant's abandoned United States application Serial No. 633,680, filed January 11, 1957.

For determining the length of the workpiece 5 the measuring carriage 2 is slidably adjusted until the workpiece 5 is supported between the points 3 and 4. For this purpose the pin 4a on which the point 4 is provided is slidably adjustable in axial direction. The pin 4a has attached thereto by means of a suitable downwardly extending framework the objective glass 10 so that the measuring result is directly determined by the position of the point 4. When the pressure of the spring 6 is constant then the device is independent of the pressure with which the point 4 engages the workpiece 5 or in other words the pressure mentioned need not be considered at all.

As shown in FIG. 2 there will appear in the viewing field of the reading device first of all a coarse measuring graduation, namely, an image of a portion of the graduation on the measuring scale 9. In the embodiment, as shown in FIG. 1, the coarse measuring graduation is subdivided into centimeter units and each centimeter graduation line consists of two closely spaced parallel lines so that between two pairs of double lines there will be a distance of one centimeter.

FIG. 2 indicates the double lines 220 and 230, and the finely graduated scale 22 will now be displaced by means of the eccentric ring 23 so far until one of its graduation lines comes to lie in the space between one of the double lines of the coarse graduation. The size of this displacement can be read off on the circular scale 24'.

According to FIG. 2 the length measured and indicated is 231.25 millimeters.

Figure 3:
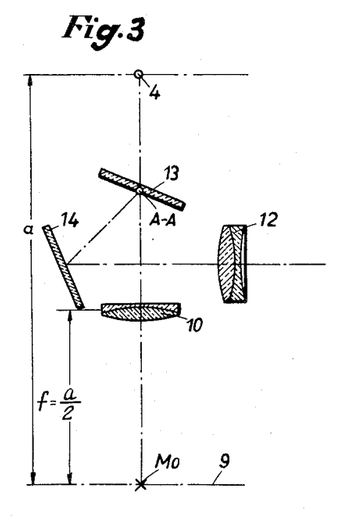
FIG. 3 illustrates the projection path of the indicating light rays without any distortion.
Figure 4:
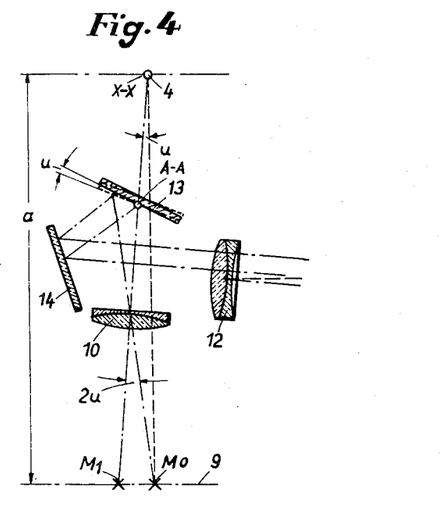
FIG. 4 illustrates the same projection path of the light rays of the indicating device in a case where a distortion has to be compensated.
Figure 5:
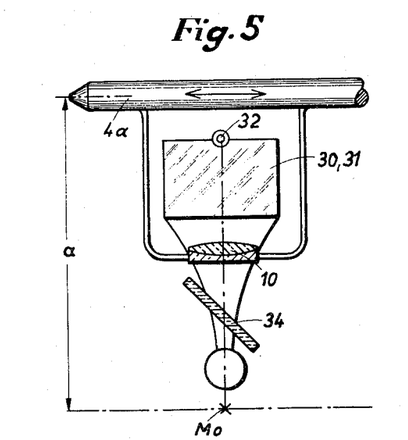
FIG. 5 illustrates a modified embodiment of the deflection compensating arrangement in side elevation view.

The measuring scale 9, as already stated, is arranged parallel to the measuring axis 25, which passes through the points 3 and 4. As soon as there occur any inaccuracies in the position of the measuring carriage or in the reading device, owing to defects in the guide 8 which supports the measuring carriage 2, for instance, when the measuring carriage 2 reaches a position in which a slight tilting of the measuring carriage takes place, then the measurement would be inaccurate. This is due to the fact that the optical axis of the lens 10 no longer passes through the measuring point $M_0$ but will pass through an adjacent point, for instance, $M_1$, as shown in FIGURE 4. In order to compensate for this error in the measurement, the mirror 13 is pivotally mounted about an axis A—A passing through the plane of the mirror 13. For this purpose, the mirror is connected with a pendulum weight 26. FIGURE 3 shows the path of the measuring ray when no distortion takes place, that is, when the guide 8 is perfect. The measuring ray coming from the point $M_0$ will then be exactly perpendicular to the measuring axis.

The tilting of the measuring carriage 2, however, at an angle $u$ about the axis X—X, as indicated in FIGURE 4, shows that the optical axis of the lens 10 will intersect the measuring point $M_1$. This displacement of the optical axis will, however, be compensated by the mirror 13, which will be tilted at the angle $u$ relative to the reading device. As shown in FIGURE 4, the measuring ray coming from the measuring point $M_0$ extends parallel to the optical axis of the lens 12 and enters the reading device proper, and here meets the focal point of the lens 12 in the reading window of the reading device. In order to compensate, in the described manner, the measuring error, the focal length $f$ of the lens 10 is made equal to $a/2$ when $a$ is equal to the distance between the measuring axis 25 and the plane of the measuring scale 9 (FIG. 3).

Figure 6:
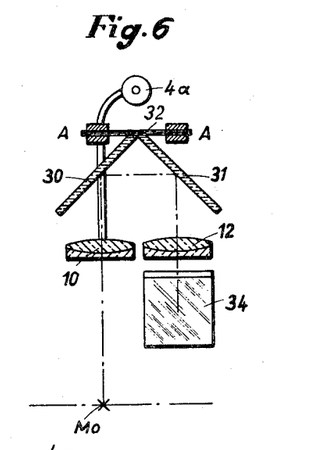
FIG. 6 shows the arrangement of FIG. 5 at a right-angle thereto and in a partial sectional view.
Figure 7:
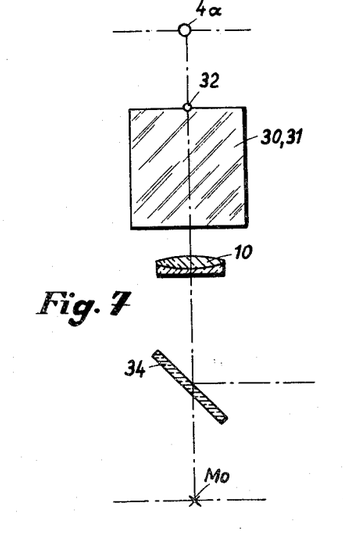
FIG. 7 illustrates the path of the light rays in the modification of FIGS. 5 and 6 without any distortion.
Figure 8:
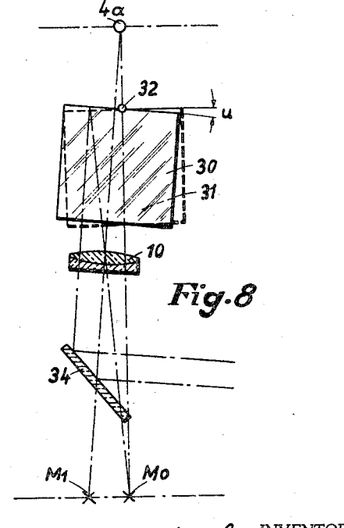
FIG. 8 illustrates the path of the light rays in the modification of FIGS. 5 and 6, but with compensated distortion.

The FIGURES 5 to 8, inclusive, illustrate a modified embodiment of the device for compensating small inclinations of the reading device. The objective glass 10 also in this embodiment is fixedly secured to the horizontal pin 4a. The plane mirror 13, however, has been replaced by an angular mirror 30–31, which is rotatable about the axis 32. The light ray coming from the measuring point $M_0$ will, as shown in FIGURE 6, pass through the lens 10, meet the mirror 30 and be reflected by the latter toward the mirror 31 and then be deflected downwardly onto a mirror 34 passing thereby through the lens 12. The mirror 34 deflects the light ray into the reading window. FIGURE 7 shows diagrammatically the path which the light ray follows in the normal position of the reading device. FIGURE 8, however, illustrates the path of the ray in such a case when the reading device as shown in FIGURES 1 and 2, is tilted at an angle $u$. As indicated in the FIGURES 7 and 8, the same result is obtained as in the FIGURES 3 and 4, except that the ray coming from the point $M_0$ is displaced outwardly of the plane of the drawing.

Figure 9:
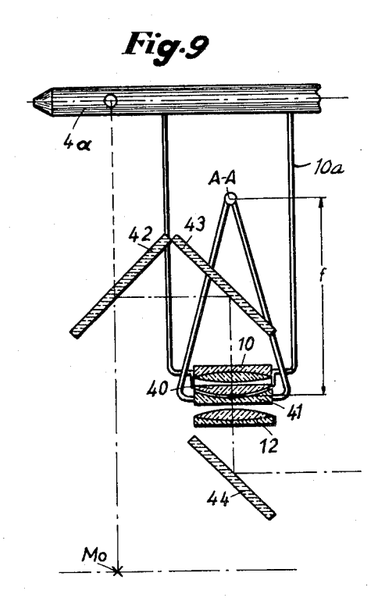
FIG. 9 illustrates another modification of the device for compensating distortion.
Figure 10:
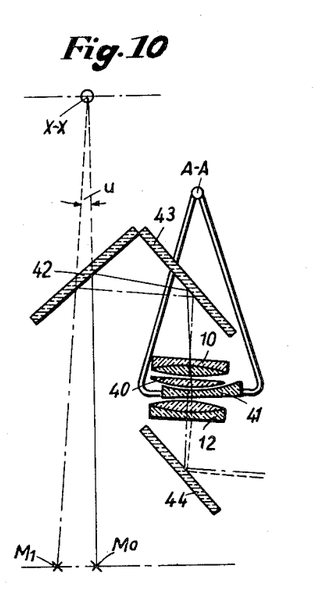
FIG. 10 illustrates the same modification as shown in FIG. 9, but indicates the manner in which a distortion is compensated.

The FIGURES 9 and 10 illustrate another modification of the invention. The pin 4a has attached thereto by means of a suitable frame 10a in FIG. 9 the objective glass 10. Between the lens 10 and the lens 12 are placed two additional lenses 40 and 41. The lens 40 is rigidly mounted in the same frame 10a which carries the lens 10, but the lens 41 is arranged to be oscillatable about the axis A—A. The ray coming from the measuring point $M_0$ is conducted by the mirrors 42 and 43 into the lens 10 and through the lenses 40, 41 and the plano-convex lens 12 and then is deflected by the mirror 44 into the reading window. The lenses 40 and 41 have the same, but opposite focal lengths. The lens 40 is plano-convex and the lens 41 is plano-concave. The axis A—A is arranged at a distance $f$ away from the principal point of the oscillatable lens 41. As shown in FIGURE 10, there takes place no ray displacement in the normal position of the measuring carriage 2 and the reading device. If, however, the reading device is tilted at an angle $u$ about the axis X—X then the position of the lens 41, relative to the lenses 10, 40 and 12, is changed. The lenses 40 and 41, as shown in FIGURE 10, form an optical wedge which deflects the light ray coming from the measuring point $M_0$ in such a manner that it will be parallel to the optical axis of the lens 12 and will meet this lens. The lens 12 therefore collects the reflected ray again in its focal plane, namely, in the reading window 11.

Figure 11:
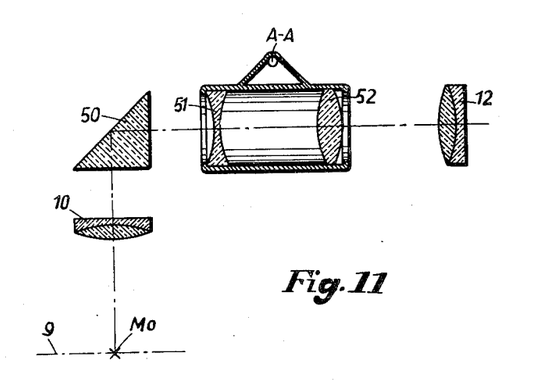
FIG. 11 illustrates still another modification of the light ray reflecting means for compensating a distortion in the indicating device.

FIGURE 11 shows another embodiment of the invention. Above the lens 10 there is arranged a right-angled prism 50 having an enlargement of $N_1 = -1$. In the rear of this right-angled prism 50 is arranged an afocal system in the form of an inverted Galilean telescope which is equipped with the axially spaced lenses 51 and 52. The enlargement produced by this Galilean system 51, 52 is $N_2 = +\frac{1}{2}$. The prism 50 and the Galilean system 51, 52 comply with the previously mentioned condition $N_1 + 1/N_2 = 1$. The Galilean system 51, 52 is pivotally mounted about the axis A—A which is spaced from the optical axis of the lens system 51, 52. An inclination of the measuring carriage 2 which would also cause a corresponding inclination of the reading device, will be compensated by the afocal system 51, 52 in such a manner that the measuring ray coming from the measuring point $M_0$ will enter the reading device parallel to the optical axis of the lens 12.

Figure 12:
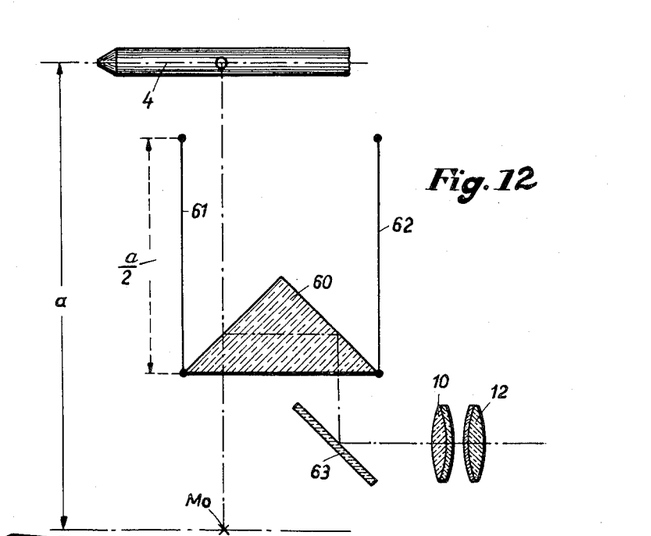
FIG. 12 illustrates still another modification of the light reflecting and compensating arrangement.
Figure 13:
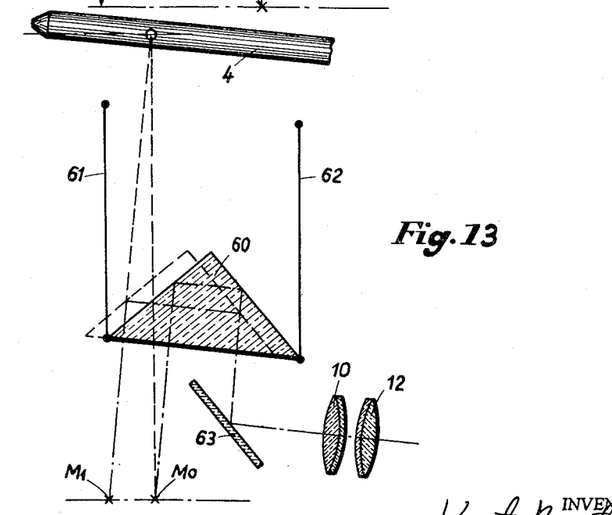

The FIGURES 12 and 13 show an embodiment of the invention in which a right-angled prism 60 is suspended by two pendulum arms 61, 62 in front of the lens 10. The length of the pendulum arms 61 and 62 is equal to one-half of the focal length of the lens 10. The measuring ray coming from the measuring point $M_0$ will be reflected twice by said prism 60 and then the measuring ray is again reflected by the mirror 63 before passing through the lenses 10 and 12 to enter the reading device. When the measuring carriage 2 is tilted, then the conditions of the reflecting means are similar to the ones illustrated in FIGURE 13. The measuring ray coming from the measuring point $M_0$ will be reflected by the prism 60 in such a manner that the measuring ray again will enter the reading device along the optical axis of the lenses 10 and 12.

Figure 14:
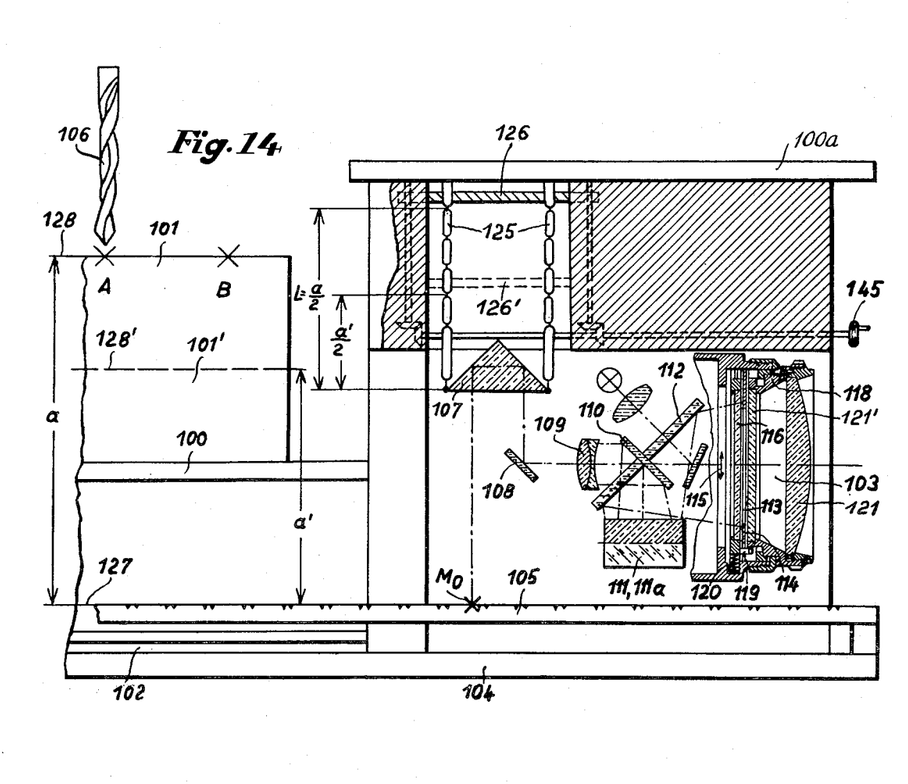
FIG. 14 illustrates an embodiment of the invention in which the measuring device is employed in connection with a workpiece to be operated upon when placed on a coordinate measuring table; this figure illustrates the compensating principle as it becomes effective when the workpiece on the measuring table is replaced by another workpiece of less height as indicated in dash lines.

FIGURE 14 illustrates an optical measuring device similar to FIGURE 1, except that the workpiece is not mounted between two points but is placed upon a measuring table 100 which is rigidly connected with a carriage 100a. The measuring table 100 is slidably adjustable along a guide 102 and the carriage 100a has mounted thereon a reading device 103 similarly constructed as the reading device illustrated in applicant's co-pending patent application, Serial No. 675,380, filed on July 31, 1957. The base 104 of the machine has attached thereto a linear measuring ruler 105. Upon the measuring table 100 is placed the workpiece 101, which is to be worked upon in the present instance by means of a drill 106 at the points A and B according to a coordinate system. The table 100 is slidably moved until the point of the drill 106 is directly above the point A and in that position the optical axis of the reading device will pass through the measuring point $M_0$ of the measuring scale 105. An image of the surrounding area of the measuring point $M_0$, including the measuring point, will be projected by means of a prism 107, a reflecting mirror 108, an objective 109 and the mirrors 110, 111, 111a and 112 into the focal plane 113 of the objective 109. In the focal plane 113 is arranged a diaphragm 114 (FIGURE 15) which covers up that area of the viewing field indicated by the shaded lines. Directly adjacent the diaphragm 114 is arranged a glass plate 116 which is slidable in the direction of the arrow 115. The glass plate 116 carries a nonius or vernier scale 117 which divides the coarse measuring scale, namely, the distance between two pairs of double lines 220 and 230 into ten parts. The displacement of the vernier scale 117 is effected by a rotary cam ring 118 which engages a pin 119 attached to the glass plate 116. A spring 120 has the purpose of holding the cam ring 118 always in engagement with the pin 119.

Figure 15:
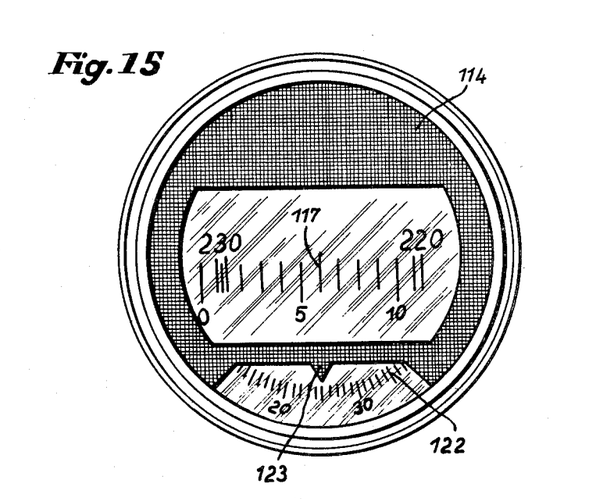
FIG. 15 illustrates a view of the reading device of the measuring device shown in FIG. 14.

The viewing area illustrated in FIGURE 15 is observed through a magnifying glass 121. This magnifying glass 121 is arranged in the rotatable cam ring 118. The rotatable cam ring 118 is also connected with a ground glass plate 121', which carries a circular scale 122. The diaphragm 114 is provided with an index 123 pointing to the graduation of the circular scale 122.

For determining the measuring value the cam ring is rotated until a graduation line of the vernier scale 117 comes to lie within the space between the double graduation lines of the coarse measuring scale. The index 123 then indicates on the scale 122 the corresponding value.

It will be noted that in FIGURE 15 the indicated measuring value is 231.25. It is, however, also possible to first adjust the reading device to the desired value and then to displace the measuring table 100 until the coarse measuring scale graduation reaches the predetermined position in the reading device.

The prism 107 is suspended by two chains 125 or rather by two pairs of chains. These chains are guided by a horizontally arranged plate 126 which is adjustable in vertical direction. By an adjustment of the plate 126 it is possible to change the length of the effective pendulum arms.

In FIGURE 14 is illustrated in full lines the length of the pendulum $L=a/2$. In this equation $a$ constitutes the distance between the plane 127 of the measuring scale 105 and the working plane 128.

If now the workpiece 101 is replaced by a workpiece 101' which is of less height as indicated in dash lines in FIGURE 14, then the top surface of the workpiece will be positioned in the horizontal plane 128'. This means that the distance between the horizontal plane 128' from the measuring scale 105 will be shorter and, as indicated, will be $a'$. Therefore, the length of the pendulum arms will have to be shortened. For this purpose, the horizontal plate 126 will be moved downwardly to the position indicated in dash lines 126'. The effective length of the pendulum will then be $a'/2$.

As illustrated in FIGURE 14, the length of the pendulum may be adjusted, step by step, according to the particular position of the working planes 128, 128', etc.

Figure 16:
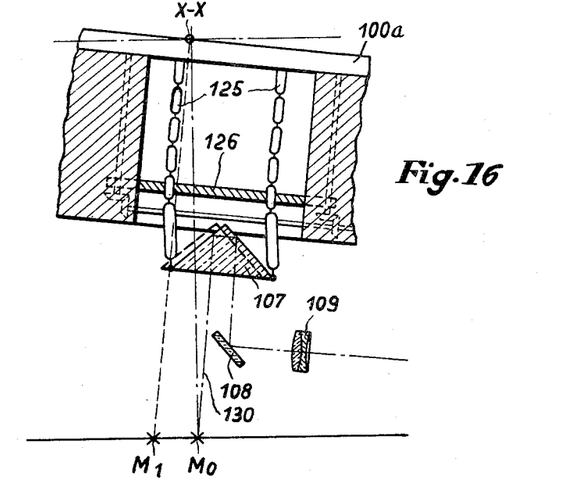
FIG. 16 illustrates the compensation effected by the optical deflector which is suspended by chains in similar manner as shown in FIG. 14, except that the level of the workpiece is arranged in a lower plane.

FIGURE 16 illustrates the paths of the measuring ray if the measuring table 100 should assume a somewhat tilted position owing to an inaccuracy in the guide 102. If an imperfection in the guide 102 causes the measuring table 100 and also the reading device 103 to tilt about the axis X—X, then the optical axis will no longer point to the measuring point $M_0$, but will point to another measuring point $M_1$. The normally horizontal plate 126 will also be tilted to the same extent. The portions of the chains 125 above said plate 126 do not change their position in the machine, but solely those portions of the chains 125 below the plate 126 will adjust themselves to a vertical position. This will have the result that the light ray 130 coming from the measuring point $M_0$ will be shifted to its parallel position with the axis of the objective 109.

Figure 17:
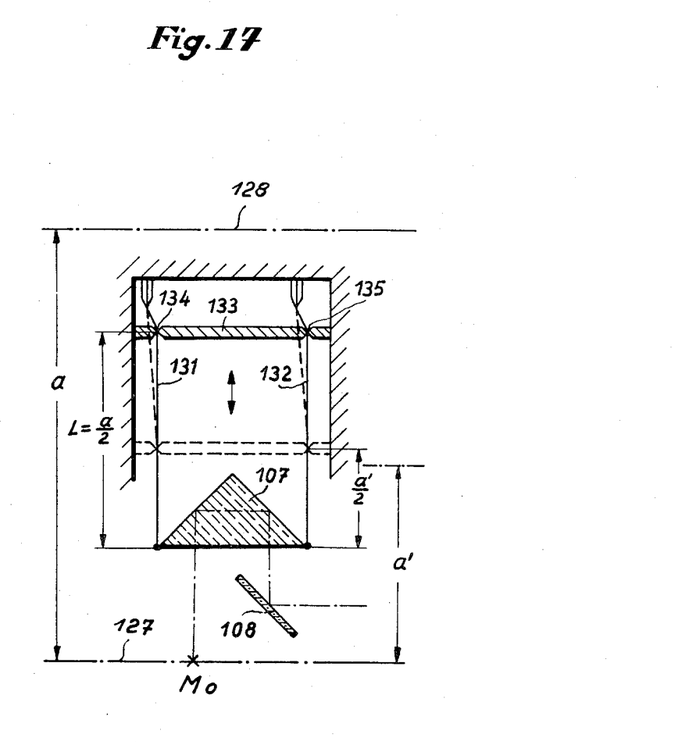
FIG. 17 illustrates a modification of the compensating device according to FIG. 14.

FIGURE 17 shows a modified arrangement in which the length of the pendulum arms is not adjustable step by step, as shown in FIGURE 14 but is continuously adjustable. For this purpose, the prism 107 is suspended by means of threads or cables 131 and 132, and these cables are passed through apertures 134 and 135 in a horizontal plate 133. The apertures 134 and 135 are very small and also somewhat offset with reference to the fixed anchoring points of the threads in the machine proper. The apertures 134, 135, therefore, constitute the bending points or the pivot points of the pendulums. The lateral displacement of the apertures 134 and 135, with respect to the upper attachment points of the cables, assures that pivot points of the pendulums are maintained reliably and accurately. The plate 133 also is adjustable in vertical direction in the same manner, as illustrated in FIGURE 14. FIGURE 14 illustrates a manually operable adjusting device, consisting of a horizontal shaft connected by bevelled gearings with vertical shafts, which, in turn, engage the horizontal plate 126 to adjust the same when the mentioned adjustment device is actuated from outside the measuring table by means of a crank 145 or the like.

Figure 18:
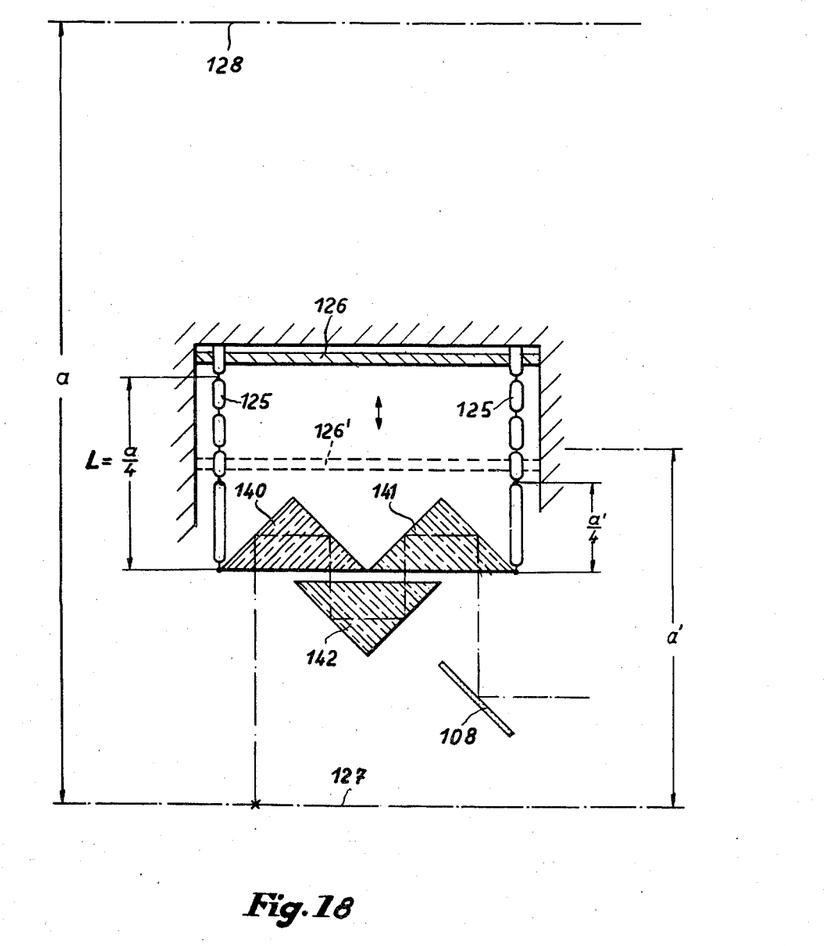
FIG. 18 illustrates still another modification of the compensating device of FIG. 14.

In all of the embodiments described in the FIGURES 14 to 17, the length of the pendulum arm L is always equal to $a/2$. If the distance of the measuring plane 127 from the working plane 128 is very great, then the length of the pendulum arm would correspondingly be great. It is, however, possible to operate with shorter pendulum arms when a modification of the invention is employed, as shown in FIGURE 18. In this embodiment, there are employed two pendulum prisms 140 and 141 in place of the single prism 107 used in the previously described embodiments. FIGURE 18 shows also the employment of an additional and fixedly mounted prism 142, which is arranged directly below the two adjacent oscillatable prisms 140 and 141. Therefore, the measuring ray which enters the prism 140 is horizontally deflected, then is deflected downwardly into the prism 142, which deflects the ray first horizontally and then vertically to enter the prism 141, and the latter directs the measuring ray downwardly toward the reflector 108, which deflects the measuring ray into the reading device. In this last named construction, the length of the pendulum arms will be only $a/4$. In other words, the pendulum length is half as long as shown in the embodiment of the FIGURES 14 to 17. The prisms 140 and 141 are suspended by means of chains 125, and the length of the latter is adjustable by means of the vertically adjustable plate 126.

Figure 19:
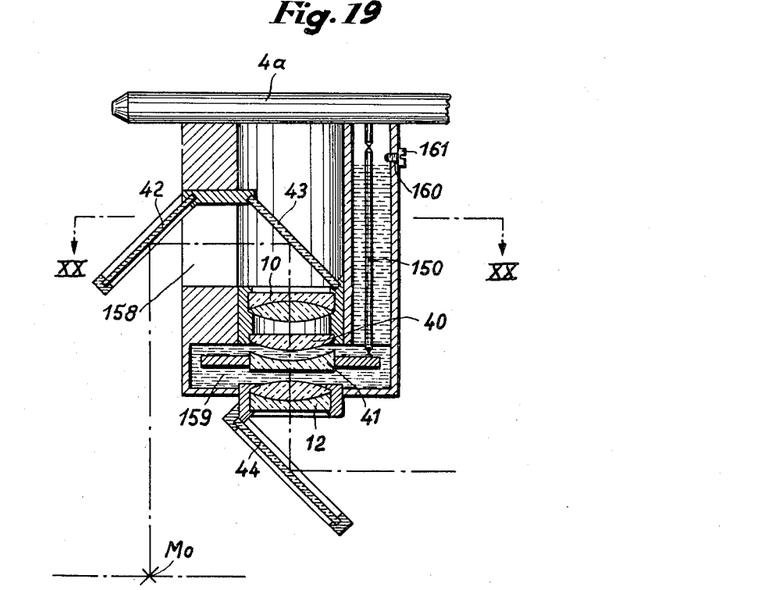
FIG. 19 illustrates altered means to suspend the pendulously mounted lens of FIG. 9.
Figure 20:
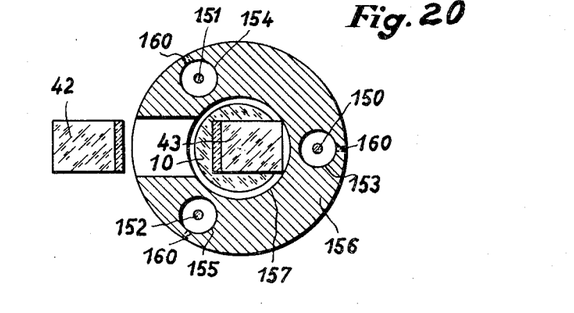
FIG. 20 is a section along the line xx—xx of FIG. 19.

FIGS. 19 and 20 show the embodiment of FIG. 9 but provided with dampening means. Lens 41 here is suspended by three filaments 150, 151 and 152. These filaments are arranged in bores 153, 154 and 155 of a body 156 carrying the lenses 10, 40 and 12 as well as the mirror 43. Mirror 43 lies in a bore 157 of body 156. Mirror 42 reflects the light coming from $M_0$ through a further bore 158 to mirror 43. Bores 153, 154 and 155 are connected by a chamber 159. In this chamber 159 lens 41 can move if the device is inclined. Bores 153, 154 and 155 have passages 160 to the air. Through any of these passages, bores 153, 154 and 155 as well as chamber 159 are filled with a liquid having a low refractive index damping the movement of lens 41, after which the passages 160 are closed by screws 161.

Body 156 is fixedly connected to pin $4a$. The action of this embodiment is the same as that of FIG. 9, except for the damping.

What I claim is:

1. In an optical measuring machine for measuring the length of workpieces, a linear measuring scale, means for supporting a workpiece above said linear measuring scale in alignment with an axis extending parallel to said measuring scale, said means including a measuring carriage, a guide extending parallel to said measuring scale for slidably supporting said carriage, an optical reading device fixedly mounted in said carriage, means for projecting a portion of said measuring scale indicating the length of the workpiece supported in the machine into said optical reading device, and at least one optical element oscillatably mounted in said measuring carriage and arranged in the path of the rays deflected into said reading device for compensating minor deflection of said reading device as may be caused by inaccuracies in said guide for said carriage.

2. In an optical measuring machine for measuring the length of workpieces, a linear measuring scale, means for supporting a workpiece in spaced relation above said linear measuring scale in alignment with an axis extending parallel to said measuring scale, said means including a head carriage and a measuring carriage, a guide extending parallel to said measuring scale supporting said head carriage and for slidably supporting said measuring carriage, said carriages being each provided with a pointed element between which the workpiece to be measured is supported, an optical reading device mounted in said measuring carriage, means for projecting a portion of said measuring scale indicating the length of the workpiece supported in the machine into said optical reading device, and at least one optical element oscillatably mounted in said measuring carriage and arranged in the path of the rays deflected into said reading device for compensating minor deflection of said reading device as may be caused by inaccuracies in said guide for said measuring carriage.

3. In an optical measuring machine for measuring the length of workpieces, a linear measuring scale, means for supporting a workpiece in spaced relation above said linear measuring scale in alignment with an axis extending parallel to said measuring scale, said means including a head carriage and a measuring carriage, a guide extending parallel to said measuring scale for slidably supporting said measuring carriage, said carriages being each provided with a pointed element between which the workpiece to be measured is supported, an optical reading device fixedly mounted in said carriage, means for projecting a portion of said measuring scale indicating the length of the workpiece supported in the machine into said optical reading device, said projecting means including an objective glass which is arranged at a distance equal to its focal length from said measuring scale, said focal length being equal to one-half of the distance between said measuring scale and the measuring axis which is coincident with the horizontal axis passing through the points of said two pointed elements, and at least one optical element oscillatably mounted in said measuring carriage in rear of said objective lens and in the path of the rays deflected into said reading device for compensating minor deflection of said reading device as may be caused by inaccuracies in said guide for said measuring carriage.

4. In an optical measuring machine for measuring the length of workpieces, a linear measuring scale, means for supporting a workpiece in spaced relation above said linear measuring scale in alignment with an axis extending parallel to said measuring scale, said means including a head carriage and a measuring carriage, a guide extending parallel to said measuring scale for slidably supporting said measuring carriage, said carriages being each provided with a pointed element between which the workpiece to be measured is supported, an optical reading device fixedly mounted in said carriage, means for projecting a portion of said measuring scale indicating the length of the workpiece supported in the machine into said optical reading device, said projecting means including an objective glass which is arranged at a distance equal to its focal length from said measuring scale, said focal length being equal to one-half of the distance between said measuring scale and the measuring axis which is coincident with the horizontal axis passing through the points of said two pointed elements, and at least one oscillatably mounted plane mirror arranged in rear of said objective lens and in the path of the rays deflected into said reading device for compensating minor deflection of said reading device as may be caused by inaccuracies in said guide for said carriage.

5. An optical measuring machine according to claim 3, in which said oscillatably mounted optical element consists of an angular mirror which deflects the light rays transversely to said measuring axis and at right angles to the axis of oscillation.

6. An optical measuring machine according to claim 3, in which said means for projecting a portion of said measuring scale into said reading device includes at least one pair of lenses, one of which is fixedly mounted in said measuring carriage, and means for pivotally mounting the other lens of said pair of lenses, said two lenses forming an optical wedge when said pivotally mounted lens is laterally displaced.

7. An optical measuring machine according to claim 3, in which said means for projecting a portion of said measuring scale into said reading device includes at least one pair of lenses, of which one lens is fixedly mounted in said measuring carriage, and means for pivotally mounting the other lens of said pair of lenses, said two lenses forming an optical wedge when the oscillatably mounted lens is laterally displaced, said two lenses of each pair having opposite but the same focal length, said pivotally mounted lens having an index of refraction equal to approximately 1.5, and its axis of oscillation is arranged at a distance from its focal point which is equal to its focal length.

8. An optical measuring machine according to claim 3, in which said means for projecting a portion of said measuring scale into said reading device includes at least one pair of lenses, of which one lens is fixedly mounted in said measuring carriage, and means for pivotally mounting the other lens of said pair of lenses, said two lenses forming an optical wedge when the pivotally mounted lens is laterally displaced, said pivotally mounted lens being plano-concave and being arranged between two plano-convex lenses fixedly mounted in said measuring carriage, the distance between said lenses being very small and being filled with a liquid having a low refractive index.

9. An optical measuring machine according to claim 3, in which said means for projecting a portion of said measuring scale into said reading device includes at least one pair of lenses, of which one lens is fixedly mounted in said measuring carriage, and means for pivotally mounting the other lens of said pair of lenses, said two lenses forming an optical wedge when the pivotally mounted lens is laterally displaced, said pair of lenses being arranged in the parallel path of rays of an objective lens positioned between said pair of lenses and said measuring scale.

10. An optical measuring machine according to claim 2, in which said means for projecting a portion of said measuring scale includes two afocal systems of which the second one is pivotally mounted and produces an enlargement $N_2$, while the first system produces an enlargement of $N_1$ and is fixedly mounted in said measuring carriage, the conditions of said two systems being:

$$N_1 + 1/N_2 = 1$$

11. An optical measuring machine according to claim 3, in which said oscillatably mounted optical element consists of a right-angled prism, and means supporting the same as a double pendulum.

12. An optical measuring machine according to claim 3, including means for rigidly connecting said objective glass with said pointed element mounted in said measuring carriage, and means for axially adjusting said pointed element relative to said measuring carriage.

13. In an optical measuring machine, a fixedly mounted base, a linear measuring scale fixedly attached to said base, a guide extending parallel to said measuring scale, a carriage mounted slidably on said guide, a measuring table adapted to support thereon a workpiece, said measuring table and said carriage being connected with each other and being slidably adjustably mounted on said guide, an optical reading device fixedly mounted on said carriage, means for projecting a portion of said measuring scale into said optical reading device and at least one optical element oscillatably supported by said measuring table and arranged in the path of the light rays deflected into said reading device for compensating minor deflection of said reading device as may be caused by inaccuracies in said guide for said measuring table, said oscillatably mounted optical element consisting of at least one rectangular prism, flexible means for suspending the same from said carriage, said flexible means consisting of chains, and means for selectively anchoring said chains at any desired link of said chains.

14. An optical measuring machine according to claim 13, in which said anchoring means comprises a substantially horizontally arranged plate, and means for adjusting said plate in a vertical direction for changing the effective length of said chains.

15. In an optical measuring machine, a fixedly mounted base, a linear measuring scale fixedly attached to said base, a guide extending parallel to said measuring scale, a carriage mounted slidably on said guide, a measuring table adapted to support thereon a workpiece, said measuring table and said carriage being connected with each other and being slidably adjustably mounted on said guide, an optical reading device fixedly mounted on said carriage, means for projecting a portion of said measuring scale into said optical reading device and at least one optical element oscillatably supported by said measuring table and arranged in the path of the light rays deflected into said reading device for compensating minor deflection of said reading device as may be caused by inaccuracies in said guide for said measuring table, said oscillatably mounted optical element consisting of at least one rectangular prism, flexible means for suspending the same from said carriage, said flexible means consisting of cables, and means for continuously adjusting the length of said cables for changing the effective length of the radius of oscillation.

16. In an optical measuring machine, a fixedly mounted base, a linear measuring scale fixedly attached to said base, a guide extending parallel to said measuring scale, a carriage mounted slidably on said guide, a measuring table adapted to support thereon a workpiece, said measuring table and said carriage being connected with each other and being slidably adjustably mounted on said guide, an optical reading device fixedly mounted on said carriage, means for projecting a portion of said measuring scale into said optical reading device including two pendulum prisms arranged in laterally spaced relation to each other in the direction of the rays passing from said measuring scale to said reading device, and a stationary mounted prism positioned with reference to said two pendulum prisms so that the light rays are reflected from one of said pendulum prisms to said stationary prism and from the latter into the other one of said pendulum prisms whereby minor deflections of said reading device caused by inaccuracies in said guide for said measuring table are compensated, flexible means for suspending said two pendulum prisms from said carriage, and means for varying the effective length of said flexible means.

17. An optical measuring machine according to claim 3, in which said means for projecting a portion of said measuring scale into said reading device includes at least one pair of lenses, of which one lens is fixedly mounted in said measuring carriage, and means for pivotally mounting the other lens of said pair of lenses, said two lenses forming an optical wedge when the pivotally mounted lens is laterally displaced, said pivotally mounted lens being plano-concave and being arranged between two plano-convex lenses fixedly mounted in said measuring carriage, the distance between said lenses being very small and being filled with a liquid having a low refractive index, three filaments carrying said pivotally mounted lens.

References Cited in the file of this patent

UNITED STATES PATENTS

| | | |
|---|---|---|
| 1,360,102 | Ericson | Nov. 23, 1920 |
| 2,474,602 | Turrettini | June 28, 1949 |
| 2,601,330 | Schmidt | June 24, 1952 |
| 2,843,001 | Werner | July 15, 1958 |